United States Patent [19]

Lee

[11] Patent Number: 4,767,817

[45] Date of Patent: Aug. 30, 1988

[54] MECHANICALLY COMPATIBLE, POLYPHASE BLEND OF POLY(VINYL CHLORIDE), CHLORINATED POLYOLEFIN, POLYOLEFIN, AND GRAFT COPOLYMER OF POLYOLEFIN, AND RIGID FIBER-REINFORCED COMPOSITE THEREOF

[75] Inventor: Biing-Lin Lee, Broadview Heights, Ohio

[73] Assignee: The B. F. Goodrich Company, Akron, Ohio

[21] Appl. No.: 23,186

[22] Filed: Mar. 9, 1987

[51] Int. Cl.[4] ............... C08K 7/14; C08L 51/00; C08L 51/04

[52] U.S. Cl. .................... 524/494; 524/504; 525/74; 525/75; 525/78; 525/80

[58] Field of Search ............ 525/74, 75, 78, 80; 524/504, 494

[56] References Cited

U.S. PATENT DOCUMENTS

| | | | |
|---|---|---|---|
| 4,029,850 | 6/1977 | Ishii et al. | 525/80 |
| 4,054,615 | 10/1977 | Hardt et al. | 525/75 |
| 4,131,636 | 12/1978 | Matsumoto et al. | 524/504 |
| 4,341,885 | 7/1982 | Schepers | 525/192 |
| 4,386,187 | 5/1983 | Grancio et al. | 525/71 |
| 4,409,364 | 10/1983 | Schmukler et al. | 525/74 |
| 4,424,309 | 1/1984 | Schepers | 525/192 |
| 4,452,838 | 6/1984 | Veno | 525/80 |
| 4,536,360 | 8/1985 | Rahrig | 523/212 |
| 4,590,241 | 5/1986 | Hohlfeld | 525/68 |

*Primary Examiner*—Herbert J. Lilling
*Attorney, Agent, or Firm*—James R. Lindsay; Alfred D. Lobo

[57] ABSTRACT

Shaped articles which have excellent solvent resistance and resistance to fatty acids are formed from a thermoplastic polyblend of poly(vinyl chloride) (PVC), chlorinated polyethylene (CPE), polyolefin (PO), and a graft copolymer of a polyolefin (PO-G). The thermoplastic polyblend contains a PO and PO-G (PO/PO-G) as a first continuous single phase, PVC and CPE as the second and third dispersed phases, and the relative amounts of the components are chosen so that there is, at most, an equal amount by weight of PO and PO-G each of which may be present in an amount as high as 40 parts by weight when the PVC is present in an amount in the range from 40 to 70 parts, so as to provide a mechanically compatible polyblend without miscibility or chemical compatibility. Further, a glass fiber reinforced (GFR) polyblend of PVC/CPE/PO/PO-G having a HDT of at least 95° C. and sufficient thermoformability to form the desired article has excellent notched impact strength. In the GFR polyblend the fibers are preferably long, at least 3 mm, and from 10–20 microns in diameter. The high HDT is obtained provided only if both co-compatibilizers and glass fibers are present in the reinforced composite.

15 Claims, No Drawings

MECHANICALLY COMPATIBLE, POLYPHASE BLEND OF POLY(VINYL CHLORIDE), CHLORINATED POLYOLEFIN, POLYOLEFIN, AND GRAFT COPOLYMER OF POLYOLEFIN, AND RIGID FIBER-REINFORCED COMPOSITE THEREOF

BACKGROUND OF THE INVENTION

This invention derives from a desire to prepare a blend of poly(vinyl chloride) (PVC) with an economical, available polymer; more particularly, to prepare a blend of PVC with a polyolefin (PO) which blend will benefit from fiber reinforcement to yield a composite which maximizes the beneficial properties and minimizes the drawbacks of the reinforced component polymers. To this end, the general approach has been to formulate a polyblend of the components which has particular superior properties compared to that of each component, then reinforce the superior blend with an appropriately sized glass fiber to produce a superior composite. Since PVC and PO are well known to be incompatible it was necessary to provide an appropriate compatibilizer which would enhance the properties of both PVC and PO.

Various methods are known to produce blends of normally incompatible polymers among which methods are grafting techniques and the use of a compatibilizer. The recognized function of the optimum compatibilizer is to produce a thermodynamically compatible blend in which the components are mutually miscible as is evidenced by a single glass transition temperature (Tg). More recently, as disclosed in U.S. Pat. No. 4,590,241 to Hohlfeld, miscible blends have been provided by blending a mixture of compatibilizing agents containing co-reactive groups. The compatibilizing agents, by themselves, are normally incompatible. The emphasis in the '241 teachings is on the concept of obtaining compatibility or miscibility of the polymer components so as to obtain better notched impact, tensile strength, and other physical properties in the polyblend which then can be conventionally reinforced, if it is desired to do so.

With particular regard to heat distortion temperature (HDT) of a blend, HDT is believed to be ratioable from the individual HDTs of the components of the blend, but the accuracy of such an approximation is progressively diminished as the blend becomes less compatible. Addition of a rubbery component to the blend makes predicting the blend's properties even more speculative. The HDT of my unreinforced polyblend is of particular interest because it is lower than that of PVC, the blend's major component relative to the other components, and the blend would elicit little interest except that it possesses surprisingly good processability and solvent resistance. Of even greater interest is the discovery that, when reinforced with inorganic fibers, and specifically glass fibers, the reinforced blend shows an improvement in HDT which cannot be accounted for with knowledge of the improvement in HDT due to glass fiber, in glass fiber reinforced (GFR) PVC.

The blend of my invention has several distinct phases. The first is a thermodynamically compatible blend of polyolefin (PO) and grafted polyolefin (PO-G) which, because its components are crystalline, forms a single phase having a single Tg. The second phase consists essentially of amorphous poly(vinyl chloride) (PVC); by "amorphous" I refer to about 10% crystallinity, or less. The third phase consists essentially of a mixture of amorphous chlorinated polyethylene (a-CPE) and crystalline CPE (c-CPE), and optionally, an impact modifier such as ethylene-propylene diene monomer (EPDM). The second phase and third phases are mechanically compatible and exhibit two Tgs. When the first phase of olefin polymer (PO/PO-G) is blended with the PVC and CPE phases, and optionally, EPDM, the reactive melt alloying of the components of the blend is insufficient to give it miscibility as well as chemical compatibility. By chemical compatibility I refer to a blend in which there is a chemical interaction, and preferably a chemical coupling between the components. The blend may exhibit a single Tg, or more than one. For example, polyblends compatibilized with reactive polymers yield chemically compatible blends. Another example is a blend of polyolefin and polystyrene with a styrene/butadiene/styrene block copolymer as taught in U.S. Pat. No. 4,386,187.

It was hoped that the graft polyolefin (PO-G) in my blend would provide it with chemical compatibility which derived from reaction of the grafted chains with sites on the PVC chain. As will be shown hereinbelow, the reaction of such grafted chains is insufficient to provide the blend with chemical compatibility. My two-phase blend has only mechanical compatibility. Since chemical compatibility, if not miscibility, is typically an essential prerequisite of a desirable blend, my blend would have been ignored, except that, within defined ranges, this mechanical compatibility is fortuitously sufficient to provide the blend with substantial rigidity when the PVC is the major component relative to each other ingredient; also, excellent solvent resistance and processing characteristics, and good low temperature impact strength.

When the blend is reinforced with inorganic fibers, the inorganic fiber reinforced (IFR) articles have surprisingly high HDT and excellent physical properties, compared with that of GFR PVC. As applied to the polyblend of my invention, the term "compatible" refers to mechanical compatibility sufficient to avoid gross phase separation under extension, and the term "miscible" refers to thermodynamic compatibility indicative of a single phase. The distinction between mechanical and chemical compatibility is made by examining the results of a test in which the soluble components are washed out, also referred to as a "solvent uptake" test, as explained hereinafter.

Among the low-cost thermoforming plastic resins, PVC is the most favored for use in pipe, pipe fittings, and assorted construction uses, usually as impact-modified PVC, because it is easy to process. Its long-standing resistance to being successfully reinforced with glass fibers was recently overcome by the choice of a particular sizing on the glass, more fully disclosed in U.S.Pat. No. 4,536,360 to Rahrig, the disclosure of which is incorporated by reference thereto as if fully set forth herein. The processability of IFR PVC, and particularly GFR PVC containing more than 20 phr fibers (parts per 100 parts PVC resin) is notably diminished as the viscosity of the mixture increases.

It was therefore desirable to lower the viscosity of an IFR blend containing at least 20 phr (parts per 100 parts of all resin) inorganic fibers, yet maintain a concentration of at least 40 parts PVC in a polyblend which is to have better impact strength and a higher HDT than one might expect because of the PVC present. It was also desirable to have a polyblend which could be reinforced with sized glass fibers not limited to those disclosed by Rahrig, supra, yet which would fail in cohesive failure. By "cohesive failure" I refer to failure of a sample of GFR blend due to tearing of blend from blend, rather than, tearing of blend from the glass surface ("adhesive failure"). Thus, cohesive failure is predicated upon the blend's properties rather than the bond between the blend and surface of the glass fiber.

Such an IFR polyblend, reinforced with long inorganic fibers, would be expected to be thermoformable over a wide range of temperature, yet not sag when moved to a thermoforming station after being brought near the desired temperature. However, the relatively amorphous nature of rigid PVC, and the broad range over which it melts, dictates that the GFR thermoformed product would not only stay relatively soft and therefore unstable in shape, but also sticky for an uncomfortably long period. To counter these drawbacks it is conventional to add stabilizers, fillers and impact modifiers which would desirably still be effective in a polyblend of PVC. Thus, it was hoped that the proper choice of polyblend components, if found to resist gross phase separation, would lend itself to manipulation with known modifiers, and yield a rigid, hard and stable GFR thermoformed product which could be handled and stacked without sticking, soon after thermoforming.

In contrast with PVC, olefin polymers such as PP, PE or E-co-P are significantly more crystalline and have a relatively sharp melting point which does not allow a laminar sheet, even when reinforced with glass or other inorganic fibers, to support its own weight without sagging. Such polymers would therefore not be likely components of a PVC polyblend with the aforesaid desirable properties.

It is well known that PVC is incompatible with PP and PE (see *Polymer Blends* Vol I, edited by Paul & Newman, Academic Press 1978). This can be confirmed, in principle, if one calculates the compatibility of PVC and PP, or PVC and PE, or PVC and PP and PE, from two pieces of information for each polymer: solubility parameter, and, molecular weight. It is generally accepted that thermodynamic compatibility is the essential requirement of a blend with improved properties relative to those of its component polymers. It is therefore particularly unexpected that such improved properties are obtained with a thermoformable polyblend which is not a thermodynamically compatible blend of polymers, but only a mechanically compatible blend. The terms "blend" and "polyblend" are used interchangeably herein.

By thermodynamically "compatible" I refer to miscibility on a molecular scale, as evidenced by a single Tg which the polyblend of this invention does not exhibit. Neither does it exhibit gross symptoms of phase separation, referred to as being 'cheesy'. What the blend does exhibit is mechanicial compatibility, resulting in highly desirable physical properties, though the HDT of the blend is not improved over that of its component polymers. Most important is the excellent processing characteristics of the blend, its smooth texture and non-cheesy consistency. These properties provide evidence of sufficient mixing of polymer segments on a microscopic scale to inculcate mechanical compatibility and a physical constraint so as to prevent demixing.

It is well known that CPE renders a blend of PVC and PO mechanically compatible, but a blend of 10 parts by wt CPE with 50 parts PVC and 50 parts PO results in a decrease in HDT. With the addition of the PO-G, mixing of polymer segments occurs resulting in further lowering of the HDT which can only be attributable to the combined presence of the CPE and PO-G which function as co-compatibilizers and which have substantially lower Tgs than PVC. This confirms that such melt alloying as does occur because of the presence of the PO-G, has little, if any, discernible effect on increasing the HDT of the unreinforced blend. In combination, these co-compatibilizers produce an interpenetrating network by quenching of the mixed system to a temperature at which demixing is not kinetically favored, without raising the HDT of the blend above the HDT of PVC.

It is this characteristic of the blend co-compatibilized with both CPE and PO-G which results in its excellent resistance to solvents, fatty acids, and ultraviolet light degradation, acceptable low temperature impact strength, paintability and printability, all of which characteristics make articles of the polyblend economically most attractive. The fact that the HDT of the blend is no better than that of PVC or PP-G is not a sufficient detriment to outweigh its processability and other properties particularly useful in a food container.

The GFR polyblend of this invention, in particular is of commercial significance because its excellent mechanical compatibility is obtained with readily available bulk polymers, making the polyblend inexpensive; and, because the GFR polyblend is easily thermoformable to provide substantially rigid shaped articles; yet the GFR polyblend has a higher HDT than one would expect of a GFR predominantly PVC polyblend containing CPE, irrespective of whether the other components were PP or PE, or PP-G. In addition to the properties of the polyblend mentioned hereinabove, GFR articles made from the inexpensive polyblend have durability over a wide range of temperature, making the articles highly marketable.

The GFR polyblend is especially suited for thermoforming sheets of it into large shaped articles such as rocker panels on automobile bodies, but may be used for smaller articles such as instrument panels, dash boards and window trim in vehicles, boats and airplanes. GFR polyblend with long glass fibers, in the form of pellets, may be injection molded to produce pump housings for solvent pumps and for acid service at moderate temperatures.

SUMMARY OF THE INVENTION

It has been discovered that chlorinated polyethylene (CPE), at least some of which contains less Cl than is required to render it essentially non-crystalline (elastomeric but crystalline CPE contains from about 15% to 25% chlorine), and a graft copolymer of a polyolefin (PO-G), together function as the essential co-compatibilizers in a polyblend containing a major amount of poly(vinyl chloride) (PVC), and a minor amount of polyolefin (PO) relative to the PVC, so as to provide a polyphase morphology. The PO and PO-G form a single continuous phase in which the PVC and CPE are dispersed. Despite the lack of substantial reactivity between the PVC and the PO-G, the blend not only has excellent uniformity and solvent resistance, but also has exceptionally good processing characteristics. The smooth surface of an article made from the blend is directly printable.

It is therefore a general object of this invention to provide a substantially rigid thermoplastic polyblend which contains a PO and PO-G (PO/PO-G) as the continuous phase, and, PVC, c-CPE and a-CPE (PVC/CPEs) as dispersed phases, the relative amounts of the components being chosen so that there is at most, equal amounts by weight of PO and PO-G each being present in a minor amount by weight relative to the PVC present, and, the amount of PVC is in the range from more than 40 to about 70 parts, so as to provide 100 parts of a mechanically compatible polyblend.

It has also been discovered that in the foregoing polyblend containing both crystalline and amorphous CPEs, the crystalline CPE (c-CPE) has a much greater depressant effect on the HDT of the blend, compared with that of the a-CPE, but it is the presence of at least 5 parts of c-CPE which provides the mechanical compatibility obtained.

It has further been discovered that in those instances where strength is essential, such a dual compatibilized polyblend in which all five components are essential, has been found to exhibit a surprisingly high heat distortion temperature (HDT) when reinforced with at least 20 parts by wt per 100 parts resin, of inorganic fibers.

It is therefore a general object of this invention to provide a long fiber reinforced polyblend of PVC/c-CPE/a-CPE/PO/PO-G having a HDT of at least 90° C., more preferably at least 95° C., and sufficient thermoformability to form a desired article of arbitrary shape and size. The high HDT is obtained provided only if the blend is reinforced with long fibers, and all five essential resin components, namely, the PVC, c-CPE, a-CPE, PO and the PO-G are present in the reinforced composite.

It has more specifically been discovered that when the PO is PP and/or PE, or E-co-P, the PO forms a single phase with the PO-G because of their common crystallinity, and the single phase is present in an amount sufficient to form the continuous phase in a polyblend with (PVC/CPEs) as dispersed phases, and when reinforced with glass fibers, preferably long fibers, imbues the GFR polyblend with a characteristic mechanical compatibility giving it a non-cheesy texture, a HDT greater than 95° C., low viscosity and excellent thermoformability; and, the presence of the PO/PO-G as the continuous phase in which the PO-G is generally present in a major amount relative to the PO, permits the use of a wide variety of types of glass fibers and sizings which are found to adhere to the polyblend so well as to provide excellent impact resistance, generally better than that of GFR PVC/CPE with the same glass fiber loading, and to fail in cohesive failure when the glass is sized for PVC/CPE. This is particularly unexpected because excellent impact with GFR PVC/CPE is known to be critically sensitive to the sizing on the glass fibers used for reinforcement (as disclosed in the aforementioned '360 Rahrig patent).

It is therefore a more specific object of this invention to formulate a thermoformable composition comprising a GFR polyblend having distinct polymer phases without miscibility but providing the polyblend with mechanical compatibility, the polyblend consisting essentially of (i) from about 10 to 40 parts by weight of olefin polymer, (ii) from about 20 but less than 40 parts of a graft copolymer of olefin polymer having a melt index in the range from about 2 to 40 grams/10 min under condition G of ASTM test D 1238-73, (iii) from more than 40 to about 70 parts of poly(vinyl chloride), and (iv) from about 10 to 30 parts chlorinated polyolefin at least 5 parts of which has a sufficiently low Cl content substantially to maintain the crystallinity of the chlorinated polyolefin, said polyblend being reinforced with (v) from 20 parts to about 70 parts by weight of glass fibers at least 10 microns in diameter and having a L/D ratio of at least $3 \times 10^4$, per 100 parts of all resin in the composite, the amount of olefin polymer being no more than the graft copolymer, and the ratio of PO to PO-G being so chosen as to provide the continuous phase, and PVC and CPEs the dispersed phases.

DETAILED DESCRIPTION OF PREFERRED EMBODIMENTS

In one embodiment, this invention relates to a polyblend chiefly of PVC and a minor amount of PO by weight (wt), relative to the PVC, which polyblend is compatibilized with co-compatibilizers (referred to as a "dual compatibilized" blend herein), the first compatibilizer being CPE, and the second PO-G. As is well known, blends containing from 40 to 60 parts by weight PVC, the remaining being polyethylene (PE), polypropylene (PP) or a copolymer of ethylene and propylene (E-co-P), are incompatible in that they suffer gross phase separation upon extension.

PVC is conventionally blended with CPE, most commonly a-CPE, as an impact modifier because a-CPE is mechanically compatible with PVC in a wide range of proportions. Typically, c-CPE is avoided because it is more rigid and less mechanically compatible. The a-CPE used is elastomeric and amorphous, that is, it contains from about 36%–48% Cl. The c-CPE is a thermoplastic rubber and typically contains less than 25% Cl, preferably from about 5% Cl–25% Cl. In the range from about 25%–32% Cl, CPE is partially crystalline, the precise degree of crystallinity in the CPE depending in part upon the process by which it is made. Over the broad range of Cl content from about 5%–48% in the CPE, it is compatible in an amount up to about 20 parts by wt per 100 parts of PVC, the properties of the resulting blend depending upon the Cl content and the relative amounts of PVC and CPE, and the relative amounts of a-CPE and c-CPE used.

In a similar manner, PP and/or PE are conventionally blended with CPE containing both less and more Cl than the amount required substantially to maintain the crystallinity of the CPE. 25% Cl content is generally regarded as the amount which demarcates the transition of CPE from crystalline to amorphous. Though the HDTs of particular blends of PVC and PO with a-CPE are known, it was not known that c-CPE had a markedly different effect compared to that of a-CPE. Nor was it known how the HDT would be affected in a blend of PVC and PO with both a-CPE and c-CPE.

Thus, irrespective of the crystallinity of the CPE, or, the relative proportions of PVC, PO, and CPE in the blend, the further addition of PO-G to produce my blend, such change in HDT as does occur, is not reasonably predictable based approximately on ratioing the HDTs of the volume fractions of the individual ingredients in the blend.

The effect of the HDT of individual components on the HDT of the blend is more fully appreciated when considered in light of the HDTs of the components in each phase, namely the PVC phase, and the polyolefin phase which includes the graft polyolefin. The particular values given in the following Table I are for a specific PVC, polypropylene, and graft polymer of PP.

TABLE I

| | HDT, °C. |
|---|---|
| Profax SB787 PP | 48 |
| +Geon ® 110 × 377 PVC | 64 |
| Profax PC PP-G** | 71 |
| PP + PP-G** | 59 |

CPE 2552, CPE 3615 and EPDM are rubbers and have HDTs below room temperature.
**acrylic acid grafted to PP.
+GEON is a registered trademark of The B. F. Goodrich Company The effect of the addition of CPE on HDT of PVC, PP, individually and together; and, on PVC, PP and PP-G together, regardless of the degree of compatibility of the blend formed, are given in the following Table II wherein the amounts of the ingredients are given in parts:

TABLE II

| Blend | HDT, °C. |
|---|---|
| PVC + CPE 2552 (c-CPE) (100/10) | 63 |
| PVC + CPE 3615 (a-CPE) (100/10) | 62 |
| PP + CPE 2552 (100/25) | 44 |
| PP + CPE 3615 (100/25) | 43 |
| PVC + PP + CPE 2552(50/50/10) | 40 |
| PVC + PP + CPE 3615(50/50/10) | 52 |
| PVC + PP + PP-G** (40/20/40) | 62 |
| PVC + PP + PP-G** + CPE 2552 (40/20/40/10) | 47 |
| PVC + PP + PP-G* + CPE 3615 (40/20/40/10) | 58 |
| PVC + PP + PP-G* + CPE 2552 + CPE 3615 + EPDM (40/20/40/5/5/5) | 47 |
| PVC + PP + PP-G** + CPE 2552 + CPE 3615 + EPDM (40/20/40/5/5/5) | 49 |

*maleic anhydride grafted to PP

It is evident from the foregoing data that the HDT of the blend of my invention is lower than that of a PVC/CPE blend, but higher than that of a PP/CPE blend. But in either case, the presence of the CPE did not significantly alter the HDT of the phase (PVC or PP).

Addition of 40 parts PP-G to a blend of 40 parts PVC, and 20 parts PP gives a HDT not significantly different from that of PVC. But the addition of the CPE has the surprising effect of lowering the HDT of the blend significantly, the c-CPE having more of an effect than the a-CPE.

However, when the PP-G is added to the PVC+PP+CPE, the processability is markedly improved, as is its printability and low temperature impact strength compared to the typical performance of PVC or certain olefin polymers such as PP, by themselves. Such improvement is obtained provided there is more PVC than PO, and there is at most an equal amount by weight of PO and PO-G. It is most preferred to have PO in an amount about one-half the weight of PO-G for good low temperature impact strength. With this low temperature impact performance and other desirable physical characteristics, articles made from the unreinforced polyblend may be used in many applications for which PVC, PP, PE, or E-co-P would not be satisfactorily used. In the past, the aforementioned desirable physical characteristics have been provided in PVC with modified styrene polymers known as high impact polystyrene, or other more expensive polyolefin copolymers, more expensive than PP, PE, or E-co-P.

Of course, PO-G is a compatibilizer for PO, but it is not an essential ingredient of a compatibilized blend of PVC/CPE/PO which is adequately compatibilized by the presence of at least 10 parts of CPE per 100 parts of PVC. If one were simply attempting to compatibilize the PVC/PO blend, the task is accomplished by the addition of the CPE, whether crystalline or amorphous, and, without the addition of the PO-G. Yet, it is PO-G which is effective in providing the blend with mechanical compatibility without significant chemical reactivity between the PVC and PO-G; and, the relatively lower HDT, compared to PVC, of the unreinforced polyblend is not a detriment.

In those instances where superior strength is demanded, reinforcing the polyblend with glass fibers raises the HDT of the GFR polyblend above that which might reasonably be attributable to the presence of the PO-G. Moreover there is no seemingly compelling reason for adding a minimum amount of crystalline CPE. Yet an essential proviso for obtaining the unexpectedly good properties of the blend is that at least 5 parts per 100 parts of PVC be crystalline CPE, that is having no more than 25% Cl, the remainder CPE being amorphous, that is having a Cl content in the range from 32–48%. In the claimed blend, the proportion of PVC predominates, and there is at most, an equal amount by weight of PO and PO-G. To obtain a substantially rigid shaped article of the polyblend, there is more PVC than either PO or PO-G, and, in general, more PO-G than PO.

The crystalline PO/PO-G phase functions as a mechanical compatibilizer only to the extent that it provides mechanical compatibility of the polyblend, but the c-CPE and PO-G are the essential components to which the increase in HDT is attributable. This improvement in HDT is obtained whether the PO used is polypropylene (PP) or polyethylene (PE), and whether the PO is low or high density, or a copolymer of ethylene and propylene (E-co-P), or a terpolymer of ethylene-propylene-diene (EPDM), or a mixture of any of the foregoing alpha-olefin polymers.

The structure of the PO-G is not narrowly critical so long as it is a graft copolymer of an olefin polymer having a melt index in the range from about 2 to 40 grams/10 min under condition G of ASTM test D 1238-73. Most preferred is a PO-G derived from a backbone of either PE, PP, or E-co-P in which backbone is grafted a graft selected from the group consisting of acrylic acid, maleic anhydride, methylacrylate and vinyl acetate. In general, if PE is used as a component of the polyblend, a graft copolymer of polyethylene (PE-G) is used; if PP is used, a graft copolymer of polypropylene (PP-G) is used; and if E-co-P is used, a graft copolymer of E-co-P is used. However, it is not essential that the grafted backbone have the same structure as the PO in the blend. Most preferred is PP grafted (PP-G) with a carboxylic acid such as acrylic acid or methacrylic acid, or an acid anhydride such as maleic anhydride, which PP-G forms a miscible mixture with PP and enhances the adhesion of the continuous phase to glass fibers.

The PVC is compatibilized in the polyblend by the presence of both the a-CPE and the c-CPE. Though as little as 5 parts of c-CPE per 100 parts of all resin in the polyblend will suffice to yield a usable polyblend, the presence of c-CPE is essential, as the desired polyblend will not be formed with adequate processability if made only with a-CPE, that is, CPE having a Cl content greater than about 25%. But the c-CPE is essential to provide the necessary nucleation and rigidity of the blend.

Thus in a preferred blend, having 30 to 70 parts of PVC and 15 to 50 parts alpha-olefin polymer with from 20 to 50 parts of PO-G, sufficient to form a continuous polyolefin phase in the blend, from about 10 to 30 parts of CPE are preferably used, and preferably from about 5 to about 15 parts of the CPE has a Cl content no greater than about 25%. It is preferred to use from 10 to 20 parts of CPE and to use about one-half of it in the crystalline form.

In addition to the foregoing five essential components of my polyphase blend, a suitable synthetic resinous impact modifier, known to be effective for improving the impact strength of PVC, may be added in an amount insufficient deleteriously to affect the uniformity and mechanical compatibility of the polyblend. Such impact modifiers include elastomeric block copolymers which are described in U.S. Pat. No. 3,265,765 to Holden et al., and in numerous publications some of which are referred to in U.S. Pat. No. 4,386,188, the disclosures of which patent and publications are incorporated by reference thereto as if fully set forth herein. The impact modifier may be present as an additional phase and is believed to act as a mechanical or structural stabilizer which interlocks the polymer structure networks in the body of the articles. Most preferred are ethylene-propylene dimer (EPDM) and styrene-butadiene-styrene block copolymers commercially available under the Kraton trademark. If used, such an impact modifier, most preferably EPDM, is used in the range from about 1 to about 20 parts per 100 parts of resin in the polyblend.

The polyblend of this invention is unique in that it has only mechanical compatibility because of the lack of chemical interaction obtained between the various chemical groups thereof, in particular, of the PO-G with the PVC. In other words, the excellent physical properties obtained, particularly the rigidity of the polyblend even without reinforcement with inorganic fibers, are not due so much to the type of chemical compatibility generally sought in a polymer alloy, as to the mechanical compatibility obtained. These properties permit the unreinforced polyblend to be thermoformed on conventional thermoforming machinery by a novel and unexpectedly effective and economical process, into shaped articles of arbitrary size and shape.

The lack of substantial interaction between PVC and the PO-G is supported by a solvent-uptake test indicating that there is essentially no loss of PO-G when a strip of a blend of PVC and PO-G is left suspended in tetrahydrofuran (THF). As would be expected, PVC is completely soluble in THF. Evidence for the substantial lack of expected interaction between the blend components is presented below.

The following blends 1 - 4 were prepared by milling the components (given in parts by wt) at 390° F. for between 1 min and 1.5 min on a two-roll mill with the designated amounts of Thermolite-31 (T-31) tin stabilizer from M&T:

TABLE III

| Components | Blend No. | | | |
|---|---|---|---|---|
| | 1 | 2 | 3 | 4 |
| Geon 110 × 377 PVC | 75 | 50. | 00. | 50. |
| Profax SB787 PP | 00. | 00. | 00. | 25. |
| Polybond 1001 PO-G | 25 | 50. | 100. | 25. |
| Thermolite T-31 stabilizer | 1.5 | 1. | 00. | 1. |
| Irganox stabilizer | 0.2 | 0.2 | 00. | 1. |

Strips were cut from 6"×3" plaques and suspended in THF solvent with mild agitation for 24 hr and 96 hr periods at the end of which, the strips were dried in a convection oven at 80° C., then weighed to determine how much THF-soluble material (PVC) was removed from each strip. The material remaining in the dried strip is set forth in Table IV herebelow as percent of original wt of the strip, and the numbers given for the remaining weight of each strip are average values of several strips.

TABLE IV

| | | % Weight Remaining After |
|---|---|---|
| Blend No. | (24 hr) | (96 hr) |
| 1 PVC/PP-G (75/25) | 25.1 | 20.7 |
| 2 PVC/PP-G (50/50) | 53.9 | 50.7 |
| 3 PP-G | 101. | 98.6 |
| 4 PVC/PP/PP-G (50/25/25) | 49.1 | 48.3 |

If there is substantial chemical interaction between the PVC and the PP-G, the remaining material would be either substantially less than, or greater than the amount of insoluble material. In other words there would be a substantial deviation from points on a line representing physical mixtures of the components. Since the remaining material in each strip after 96 hr corresponds closely to the weights of PP and PP-G in each strip, it is evident that the PVC was not chemically reacted with the PP-G.

Though a blend of PVC/CPE and PP/CPE or PE/CPE is mechanically compatible in a range of proportions which result in a rigid composition, and yields a non-cheesy mixture, the HDT of the blend decreases relative to that of PVC which is about 64° C. As will presently be shown, even when a compatible non-cheesy blend of PVC/CPE/PP is formed, its processability is not particularly good, and its HDT is not reasonably predictable.

Since the polyblend of this invention has excellent solvent resistance to alcohol, vinegar, lower alkyl ketones and non-aggressive solvents, and resistance to oils and fats, it is especially suited for packaging food products. The composition of the blends is readily tailored for containers, and tightly fitting covers therefor, having a wall thickness ranging from about 10 mils to about 50 mils or more, depending upon how the article is to be thermoformed. Typically, the article is formed by injection molding.

A thermoforming process is used to form sheets in the range from about 10 mils to about 100 mils, though sheets as thick as 500 mils or more can be formed for use in panel-like parts. The process to form a sheet comprises mixing the ingredients to produce a mechanically compatible polyblend having the aforespecified composition, then forming a sheet by extrusion or calendering.

When the PO-G is blended with a minor proportion of PO, relative to the PO-G, and, the PVC is blended with a minor proportion of CPEs relative to the PVC, or the PO-G, or the PO, then the polyblend formed not only has mechanical compatibility, but when reinforced with long inorganic fibers, produces an unexpectedly high HDT. When reinforced with inorganic fibers, particularly glass fibers about 10 microns in diameter, the blend provides a rigid GFR composite of a mechanically compatible blend of PVC, CPE and a PO (either PE, PP, or E-co-P), and optionally, EPDM or other rubbery modifier. The high HDT is not attainable without using the co-compatibilizers. Longer glass fibers, at least 3 mm long, are preferred to minimize crack propagation and to absorb sudden impacts If the sheet is to be reinforced with long glass fibers, the desired amount of fibers, from 20 to about 70 parts by weight, are incorporated in the blend and extruded or calendered at a temperature above the softening point. Large parts, even if unreinforced, are typically vacuum formed or molded in matched molds, but are most often reinforced with inorganic fibers to give them superior strength. Articles of arbitrary shape may be molded from the reinforced sheet by heating it to its softening point, advancing the softened sheet to a thermoforming station having molds shaped to produce the desired shape, and molding the sheet in the thermoforming station.

While particularly suited for thermoforming, the polyblend is also easily injection molded, even when reinforced with fibers. In addition, the blend, with or without fiber reinforcing, is suitable for co-extrusion. For example, a laminar sheet of PO-G, PP or even another polymer bondable by co-extrusion, such as polystyrene, may be co-extruded onto the blend to provide a specific property such as the high gloss afforded by polystyrene. In another example, the polyblend may be co-extruded or otherwise directly bonded to an aluminum metal surface to form siding panels clad with the blend for use in housing construction. The aforementioned properties of the blend are not obtainable by any one of the blend components, or any combination of two or more of the blend components, unless all, namely PVC, PO, a-CPE, c-CPE and PO-G are present.

When a blend containing the other components, but not containing PO-G is reinforced with glass, the only improvement in HDT is that which is predictable because of the presence of the additional glass fibers. The HDT of an unreinforced blend containing all components is surprisingly low, presumably due to the presence of the CPEs, compared to an expected HDT obtained by ratioing the HDTs of the components.

In the most preferred embodiment of the invention, shaped reinforced articles of superior strength and high HDT are formed by reinforcing the polyblend with inorganic fibers. A process for molding a fiber reinforced article of arbitrary shape comprises, (a) feeding to a heating station, a reinforced thermoplastic sheet formed from the polyblend reinforced with from 20 parts to about 70 parts by weight of fibers per 100 parts of all resin in the reinforced thermoplastic sheet, (b) heating the sheet to its softening point so as to form a softened sheet, (c) advancing the softened sheet to a thermoforming station having molds shaped to produce said arbitrary shape, and, (d) molding the softened sheet in the thermoforming station.

The improvement in HDT is particularly noticeable with long fibers having an L/D ratio of at least $3 \times 10^4$ The composition of the inorganic fiber is not narowly critical, and the improvement in HDT may also be observed with graphite, boron and ceramic fibers but glass fibers are most preferred.

Though the type of glass is not critical, relatively soda-free lime-aluminum borosilicate glass, such as "E" and "S" glass is preferred, drawn into fibers having a diameter less than 20 microns, preferably from 10 to about 16 microns. Whether the fibers are bundled into yarns, ropes or rovings, or woven into mats, and the like, is not critical to the invention, but it is most convenient to use glass fibers in the form of chopped strands from about 3 mm to about 26 mm long. In the composition most preferably used for producing pellets in the size range from about 10 mm to about 50 mm in equivalent diameter, which pellets are used to mold shaped articles, glass fiber lengths generally less than 10 mm will be encountered because, during compounding, considerable fragmentation will occur, some fibers being shorter than 3 mm. To maintain the length of the fibers it is preferred to compression mold the articles.

It is most economical to use glass fibers having a length in the range from about 6 mm to 18 mm and a diameter in the range from about 10 to 15 microns. Despite the high L/D ratio, molded articles have a smooth, lustrous surface which is directly printable and paintable with conventional paints, especially polyurethane and epoxy paints. When a baking-type alkyd melamine or acrylic paint is coated on the molded article and baked at 130° C. for 30 min the deformation is not significant and the adhesion of the coated film is good.

The best properties of the thermoformed composites are obtained when the glass fibers are present in an amount in the range from about 20 parts to about 70 parts per 100 parts of all resin, that is the combined weight of PVC, PO, CPEs and PO-G. All references herein to parts of glass fibers, refers to parts of glass fibers per 100 parts of combined resin. It will be appreciated that less than 20 parts fibers has little reinforcing value, and more than 70 parts by wt of fibers, relative to the amount of polyblend, results in a mixture which becomes progressively less and less satisfactorily processed by conventional methods.

It should be noted that in all instances, whether the sizing on the glass is chosen to be particularly adapted for compatibility and optimum adhesion with the PVC, the bonding of the blend to the fibers is characteristically so strong that a composite of thermoformed reinforced polyblend fails in cohesive failure. This is particularly noteworthy since a relatively large amount of polymers other than PVC is always present in the blend, and one would not expect a glass fiber sized specifically for compatibility with PVC, to yield a bond (with the blend) strong enough to fail in cohesive failure.

In the most preferred embodiment of the invention the PVC homopolymer is obtained by either the mass or suspension polymerization techniques, in the form of porous solid macrogranules. Suspension polymerized PVC deisrably has a porosity in the range from about 0.14 to about 0.35 cc/g, a surface area in the range from about 0.6 m²/g to about 3 m²/g, and an inherent viscosity in the range from about 0.46 to about 1.2, that is, having a relatively high molecular weight. The mol wt may be related to its inherent viscosity which is determined as taught in U.S. Pat. No. 4,412,898. The most commonly used PVC resins have an inherent viscosity in the range from about 0.53 to about 1.1, or slightly higher, and are referred to as "rigid PVC". Such a resin is commercially available from The B.F.Goodrich Company under the Geon ® $110 \times 346$ and $10 \times 377$ designations.

Glass fibers for use herein are conventionally sized with known aminosilane coupling agents and film formers, surfactants, lubricants and the like, but the fibers have unexpectedly shown an improvement in the HDT relative to that of PVC/CPEs/PO provided the blend also contains an amount of PO-G sufficient to raise the HDT to 95° C. Such a GFR blend also exhibits improved impact and tensile strength in composites such that a PVC/CPEs/PO/PO-G composite containing 50 wt % glass has a minimum tensile strength of 15,000 psi, a notched Izod impact of at least 3.5 ft.lb/in, and a HDT as high as about 133° C. Such strength and HDT has never before been deliberately or reproducibly attained in PVC/CPEs/PO blends and is clearly attributable to the presence of the c-CPE and PO-G.

The unreinforced polyblend is prepared by any known method for melt-processing PVC/CPE or PO/PO-G, and the blend formed is reinforced simply by the addition of the glass fibers in a known manner. For example, PVC, CPE, PP and PP-G along with stabilizer, antioxidant, and an impact modifier such as EPDM are typically melt blended on a two-roll mill at a temperature below that which is deleterious to the blend, preferably in the range from about 160°-220° C., and most preferably in the range from about 180°-210° C. The sheet is removed and may then be thermoformed into the desired article. Glass fibers in the amount desired are added to the molten polymers on the mill and blending is continued without degrading the polyblend until the fibers are substantially uniformly dispersed.

The process for producing a thermoformable synthetic resinous sheet by extrusion comprises, mixing the polyblend and from 20 parts to 70 parts by weight of glass fibers per 100 parts of all resin in the polyblend, to yield a reinforced thermoformable blend characterized in that the heat distortion temperature of the reinforced thermoformable blend is at least 95° C., and, forming a sheet from the reinforced thermoformable blend by extrusion. A continuous extrudate may also be formed by pultrusion on commercially available equipment.

As used herein, the term "consists essentially of" means that the named ingredients are essential, though other ingredients which do not vitiate the advantages of the invention can also be included. Ingredients conventionally employed in the art, such as impact modifiers, pigments, dyes, fillers like talc, mica, clay and the like, light stabilizers, heat stabilizers, antioxidants, pigments, coloring agents, mineral oil, and dyes as may be required for a particular purpose, may be included in the blend, as desired it being recognized that the amount of the additive(s) used will affect the physical properties of the thermoformed composite. A particular advantage of the blend is the ability to use "regrind" scrap mixed with virgin feedstock.

Preparation of PVC/CPE/PO/PO-G Polyblend for Testing

All the compounding ingredients, namely PVC, CPE, PO, PO-G, stabilizer are 'powder-mixed' in an Oster blender for 2 min at high speed (about 3000 rpm). An aliquot of the powder mixture (105 g) was then milled on a Getty Model 60 4"×9" electric mill at a mill roll temperature of 190° C. using a roll separation of 0.025" and fused to a smooth textured non-cheesy blend in about 1 min. The unreinforced sheets of polyblend were taken off the mill for subsequent thermoforming.

An unreinforced sheet of polyblend has the following properties:

| Sheet thickness | 50 mils |
|---|---|
| Notched Izod (20° C.) | 0.9 ft-lb |
| Notched Izod (−20° C.) | 0.65 ft-lb |

Preparation of GFR composite of PVC/CPE/PO/PO-G Polyblend for Testing

All the compounding ingredients were 'powder-mixed' in a Henschel high speed mixer, then milled on the Getty mill at a mill roll temperature of 190° C. using a roll separation of 0.025", as described hereinbefore. Then 105 g of the powder is fed to the mill and fused in about 1 min. after which 44 g of chopped glass fibers about 6.4 mm long, which have been treated with an aminosilane and film former were added to the PVC while milling is continued. The GFR sheets were taken off the mill and labeled to distinguish the mill direction from the transverse direction.

In each case, the milled sheets were constant volume molded into 6"×3"×0.125" plaques. In this procedure the mold was preheated to 190° C. for 10 min. Then a 40 g section of GFR polyblend sheet was added to the mold. Care was taken to assure that all mill stock added to the mold was maintained at the same orientation. The mold was then placed into the press and over a 1 min time span, a pressure and release schedule of 5, 10, 20 and 30,000 lbf (pounds force) was followed. The pressure was then pumped to 30,000 lbf a second time and maintained for 1 min. The mold was then transferred to a cold press and allowed to cool for 10 min under pressure. Impact test samples were cut and routed from these plaques. Again care was taken to identify sample orientation relative to the mill direction during the operation of these test samples.

Pellets of the composition of this invention are preferably formed in a pelletizing extruder after the composition is masticated in a Buss Kneader into which the blend and other compounding ingredients are fed, as described in the '360 patent. The pellets may then be extruded, injection molded or compression molded. Pellets of the GFR polyblend may also be made by pultruding continuous fiber through the molten blend, and then cutting to desired length. Thus, the length of the fiber is that of the pellet. Pellets of 0.5" are preferred for injection molding, and 1" or longer for compresion molding.

Sheets of the GFR blend may be prepared by impregnating glass mat, sized as described hereinabove, with the blend so that there is the requisite glass in each sheet, any of which sheets, after impregnation, has a HDT of at least 95° C. A reinforced sheet, and preferably several such sheets cut to a predetermined configuration, are heated to their softening point so as to form softened sheets which are then advanced to a thermoforming station where they are molded at a temperature of 160°-200° C. and a pressure of about 1000 psi (about 30,000 lbf) to form a shaped article.

Shaped articles may also be prepared by resin transfer molding, that is, by impregnating glass fibers, roving or mat within a mold, with molten polyblend.

The following samples were prepared for testing:

EXAMPLE 1

100 parts Geon ®110×377, 2 parts of T-31 tin stabilizer, 10 parts CPE 2552 (25% Cl in the CPE), and 5 parts CPE 3615 (36% Cl in the CPE) are mixed on an electric two-roll mill at 190° C. until a uniform non-cheesy blend is formed. The sheet is removed from the mill in a thickness of about 5 mm and while still hot cut into rectangular pieces about 6"×3". One or more of these pieces is then placed in a mold and pressed to produce uniformly thick samples for testing. Typical test bars are formed by molding a single piece (cut from the sheet off the mill) to a 6"×3" rectangle, 0.125" thick from which test bars about 6"×1.0" are cut for Izod and HDT tests.

EXAMPLE 2

In addition to the ingredients used in the foregoing example 1, 30 parts of 3130 glass fiber (obtained from PPG Industries), sized with an alkylene oxide film-former and an aminosilane coupling agent, are added to the mixture while it is mixed at the same 190° C. temperature. The mixing was continued until a uniform smooth sheet was obtained without evidence of degradation, and cooled and comminuted for molding into test bars, as before.

EXAMPLE 3

The procedure of foregoing example 2 was repeated except that 50 parts of 3130 glass were used, instead of 30 parts.

EXAMPLE 4

The procedure of foregoing example 3 was repeated except that 5 parts of EPDM (BFG373) were added to the glass reinforced polyblend.

EXAMPLE 5

40 parts Geon®110×377, 1 part of T-31 tin stabilizer, 60 parts of Profax SB787 polypropylene obtained from Himont, 5 parts CPE 2552 (25% Cl in the CPE), and 5 parts CPE 3615 (36% Cl in the CPE), 5 parts EPDM and 50 parts of 0.25" long glass fibers are mixed on an electric two-roll mill at 190° C. until a uniform non-cheesy blend is formed. The sheet is removed from the mill and cooled before it is comminuted and molded into test bars.

EXAMPLE 6

The procedure of foregoing example 5 was repeated except that 20 parts of Profax SB787 and 40 parts of polypropylene grafted with maleic anhydride, commercially available as ProfaxPC from Himont, were used instead of the 60 parts PP previously added to the glass reinforced polyblend.

EXAMPLE 7

The procedure of foregoing example 6 was repeated except that 40 parts of polypropylene grafted with acrylic acid commercially available as Polybond resin from British Petroleum, were used instead of 40 parts of polypropylene grafted with maleic anhydride.

In the following Table V is tabulated the quantities of each ingredient (parts by weight) in each sample, so that their combined effect on the HDT may be compared.

TABLE V

| Ex. | PVC | CPE 2552 | CPE 3615 | EPDM | PP | PP-G | Glass | HDT °C. |
|---|---|---|---|---|---|---|---|---|
| 1 | 100 | 10 | 5 | — | — | — | — | 61 |
| 2 | 100 | 10 | 5 | — | — | — | 30 | 72 |
| 3 | 100 | 10 | 5 | — | — | — | 50 | 76 |
| 4 | 100 | 5 | 5 | 5 | — | — | 50 | 76 |
| 5 | 40 | 5 | 5 | 5 | 60 | — | 50 | 78 |
| 6 | 40 | 5 | 5 | 5 | 20 | 40* | 50 | 103 |
| 7 | 40 | 5 | 5 | 5 | 20 | 40** | 50 | 131 |

*maleic anhydride grafted to PP
**acrylic acid grafted to PP

In the following Table VI is listed certain physical properties of the specific examples of polyblends prepared as described hereinabove, and all except example 1, contain glass.

TABLE VI

| Ex. | Notched Izod impact (ft-lb/in) | Unnotched Izod impact (ft-lb/in) | HDT - Heat Distortion Temp. °C. (no annealing) |
|---|---|---|---|
| 1 | 0.6 | NA | 61 |
| 2 | 1.4 | NA | 72 |
| 3 | 2.5 | 8 | 76 |
| 4 | 2.5 | 12 | 76 |
| 5 | 4. | 7.5 | 78 ± 2 |
| 6 | 3.5 | 7.5 | 103 ± 5 |
| 7 | 4.5 | 10 | 131 ± 2 |

It is evident from the foregoing that there is about a 25% improvement in HDT when impact modified PVC (ex 4) has 50 parts glass in it (compared with ex 1 with no glass). But when 50 parts glass are added to the blend (exs 6 and 7), there is over a 70% and 100% increase in HDT, respectively.

In the following Table VII is listed the apparent shear viscosity at 190° C. (pascal.sec) at various shear rates (sec$^{-1}$) for each of the above samples in which the amount of glass fibers is 50 parts, except for samples 1 and 2; sample 1 contains no glass fiber and sample 2 contains 30 parts.

TABLE VII

| Shear rate (sec) | Apparent shear viscosity at 190° C. (pascal.sec) | | | | | | |
|---|---|---|---|---|---|---|---|
| | ex. 1 | ex. 2 | ex. 3 | ex. 4 | ex. 5 | ex. 6 | ex. 7 |
| 170 | 1662 | 2128 | 2363 | 2363 | 1030 | 934 | 1017 |
| 427 | 798 | 1028 | 1138 | 1116 | 547 | 476 | 508 |
| 854 | 480 | 601 | 651 | 645 | 333 | 210 | 292 |

It is evident that the shear viscosity for the blends containing the PP-G (exs. 6 and 7) is lower than that of PVC alone (ex.1) or of GFR PVC (exs. 2, 3 and 4); and, also lower than that of the blend containing a greater amount of PP (wt) than the amount of PP-G present (ex. 5).

The effect of the addition of CPE on HDT of the reinforced blend (containing 50 parts glass fibers) in which the amounts of the ingredients are given in parts, but without PVC in the blend is as follows:

| | HDT, °C. |
|---|---|
| Profax PP (60) + PP-G** (40) | 132 |
| Profax PP (60) + CPE 2552 (10) + PP-G** (40) | 138 |
| Profax PP (60) + PP-G* (40) | 122 |
| Profax PP (60) + CPE 2552 (10) + PP-G* (40) | 102 |

As will be evident, the effect of CPE, which is a rubber, in one instance, produces an increase in HDT, and in the other, a decrease. The addition of a rubbery impact modifier such as EPDM does not help predict the effect of the CPE.

From the foregoing, it will now be evident that the presence of components likely to have sufficient chemical interaction in the blend to form a reactive melt alloy, characterized by the miscibility of its components, does not necessarily result in obtaining such miscibility. Despite the desirability of miscibility in a polyblend, there may be only sufficient interaction to provide a polyphase blend having only mechanicial compatibility. Yet, such mechanical compatibility may provide the polyblend with properties which might be all that one originally hoped to inculcate in a miscible polyblend which was never formed.

I claim:

1. A thermoformable polyphase polyblend composition having distinct first, second and third phases without miscibility but with mechanical compatibility, the polyblend consisting essentially of (i) from 10 to 40 parts by weight of olefin polymer (PO), (ii) from 20 but less than 40 parts of a graft copolymer of olefin polymer (PO-G), the graft copolymer having a melt index in the range from about 2 to 40 grams/10 min under condition G of ASTM test D 1238-73, (i) and (ii) forming the first phase; (iii) from more than 40 to about 70 parts of poly(vinyl chloride) (PVC) forming the second phase, and (iv) from 10 to 30 parts chlorinated polyethylene (CPE) at least 5 parts of which has a Cl content sufficient substantially to maintain its crystallinity, forming the third phase; the amount of PVC, PO and PO-G being chosen so that there is more PVC than PO, and at most an equal amount by weight of PO and PO-G so as to provide the continuous first phase in a substantially rigid blend, and PVC and CPE the dispersed phases.

2. The polyblend composition of claim 1 reinforced with from 20 parts to about 70 parts by weight of inorganic fibers per 100 parts of all resin, to yield a reinforced thermoformable blend having a heat distortion temperature of at least 95° C.

3. The polyblend composition of claim 1 wherein said polyblend includes a synthetic resinous impact modifier for the continuous first phase, said impact modifier being present in an amount in the range from about 5 parts to about 15 parts per 100 parts by weight of all resin in the blend.

4. The polyblend composition of claim 2 wherein said polyblend includes an impact modifier for the continuous phase, said impact modifier being present in an amount in the range from about 5 parts to about 15 parts per 100 parts by weight of all resin in the blend, and said inorganic fibers are glass fibers.

5. The polyblend of claim 4 wherein there is more PVC than either PO or PO-G, and more PO-G than PO.

6. The polyblend of claim 5 characterized in that it fails in cohesive failure.

7. The polyblend of claim 3 wherein the PO-G is a graft copolymer having a backbone selected from ethylene, propylene, and ethylene-co-propylene, in which is grafted a graft selected from the group consisting of acrylic acid, maleic anhydride, methylacrylate and vinyl acetate.

8. The polyblend of claim 4 wherein the PO-G is a graft copolymer having a backbone selected from ethylene, propylene, and ethylene-co-propylene, in which is grafted a graft selected from the group consisting of acrylic acid, maleic anhydride, methylacrylate and vinyl acetate.

9. A shaped article formed from a thermoformable polyblend having distinct phases without miscibility but with mechanical compatibility, the polyblend consisting essentially of (i) from 10 to 40 parts by weight of olefin polymer (PO), (ii) from 20 but less than 40 parts of a graft copolymer of olefin polymer (PO-G), the graft copolymer having a melt index in the range from about 2 to 40 grams/10 min under condition G of ASTM test D 1238-73, (i) and (ii) forming the first phase; (iii) from more than 40 to about 70 parts of poly(vinyl chloride) (PVC) froming the second phase, and (iv) from 10 to 30 parts chlorinated polyethylene (CPE) at least 5 parts of which has a Cl content sufficient substantially to maintain its crystallinity, forming the third phase; the amount of PVC, PO and PO-G being chosen so that there is more PVC than PO, and at most an equal amount by weight of PO and PO-G so as to provide the continuous first phase in a substantially rigid blend, and PVC and CPE the dispersed phases.

10. The shaped article of claim 9 wherein said polyblend includes a synthetic resinous impact modifier for said continuous phase, said impact modifier being present in an amount in the range from about 5 parts to about 15 parts per 100 parts by weight of all resin in the blend.

11. The shaped article of claim 9 wherein said olefin polymer is selected from the group consisting of polyethylene, polypropylene, and ethylene-propylene-diene terpolymer.

12. The shaped article of claim 11 wherein said graft copolymer is of an olefin backbone selected from polyethylene, polypropylene, and poly(ethylene-propylenediene), and said graft is selected from the group consisting of acrylic acid, maleic anhydride, methylacrylate and vinyl acetate.

13. The shaped article of claim 12 wherein said polyblend consists esssentially of polypropylene present in an amount in the range from 10 to 40 parts, graft copolymer of propylene from 30 but less than 40 parts, chlorinated polyethylene from 10 to 15 parts, and poly(vinyl chloride) from 40 to 70 parts by weight.

14. The shaped article of claim 9 wherein said polyblend includes, in addition, from 20 parts to about 70 parts by weight of glass fibers per 100 parts of all resin in said polyblend to yield a reinforced thermoformable blend having a heat distortion temperature of at least 95° C.

15. A process for producing a thermoformable synthetic resinous sheet which comprises, mixing a polyphase polyblend composition having distinct first, second and third phases without miscibility but with mechanical compatibility, the polyblend consisting essentially of (i) from 10 to 40 parts by weight of olefin polymer (PO), (ii) from 20 but less than 40 parts of a graft copolymer of olefin polymer (PO-G), the graft copolymer having a melt index in the range from about 2 to 40 grams/10 min under condition G of ASTM test D 1238-73, (i) and (ii) forming the first phase; (iii) from more than 40 to about 70 parts of poly(vinyl chloride) (PVC) forming the second phase, and (iv) from 10 to 30 parts chlorinated polyethylene (CPE) at least 5 parts of which has a Cl content sufficient substantially to maintain its crystallinity, forming the third phase; the amount of PVC, PO and PO-G being so chosen so that there is more PVC than PO, and at most an equal amount by weight of PO and PO-G so as to provide the continuous first phase, and PVC and CPE the dispersed phases, and, (v) from 20 parts to about 70 parts by weight of inorganic fibers at least 10 microns in diameter and L/D ratio of at least $3 \times 10^4$, per 100 parts of all resin to yield a reinforced thermoformable blend, whereby the heat distortion temperature of the reinforced thermoformable blend is at least 95° C., and, forming a sheet from said reinforced thermoformable blend by extension.

* * * * *